9823X
W. Campbell,
Awl Handle,
Patented July 1, 1836.
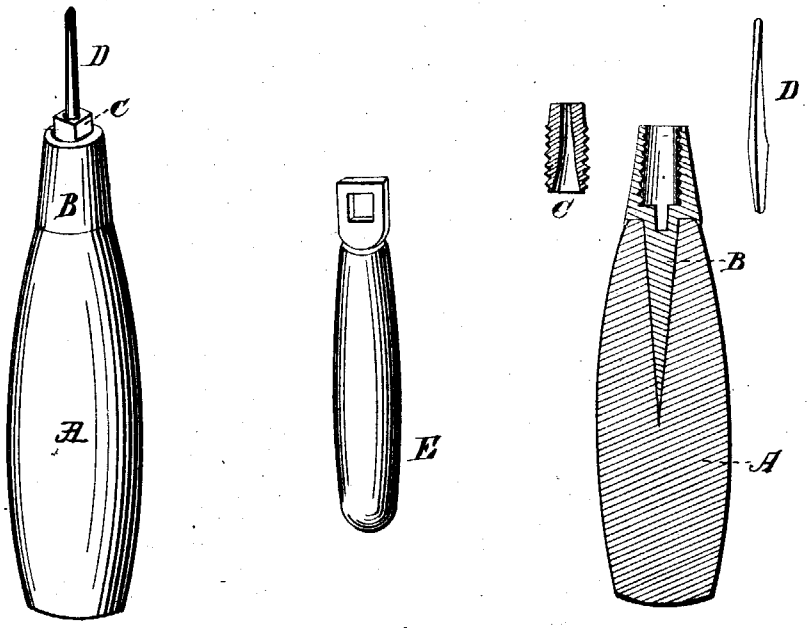
AM. PHOTO-LITHO. CO. N.Y. (OSBORNE'S PROCESS)

9823X. July 1, 1836 6.

William Campbell, Gilsum, New Hampshire;

Letters Patent.

The Schedule, referred to in these Letters Patent and making part
of the same, containing a description in the words of the said William Camp-
bell himself of his "Improvement in the socket shank Awl haft."

To all to whom these presents shall come.
Be it known that I William Campbell, of Gilsum, in the County of Chesh-
-ire in the State of New Hampshire, have invented a new and useful
Machine or Tool called "The Socket Shank and haft" And that the following
is a full and exact description thereof. The use of the Socket Shank
Awl haft is to hold the Awl for making holes for the insertion of pegs
in leather whether in the manufacture of shoes and boots, or any other manu-
factures of leather where pegs are used. It is constructed as follows.
1st There is a socket shank inserted in wood or any other material used
for a handle far enough to be set firmly, and protruding from the wood
or other Material three eighths of an inch with a screw thread on on
the part that protrudes. the diameter of the protruding part five sixteenths
of an inch. in this part is a square socket to receive the shank of the
Awl, this socket may be made triangular 6 or 8 sided or four sided
& not square but the square is preferable. This socket shank may be
of iron or steel. 2dly. There is a nut of brass [illegible] fitting the thread
of the screw on the socket [illegible] [illegible] nine sixteenths of an inch in length
the rim of the nut thinest at the forward part to give a proper shape
to the haft. 3dly. a screw to fit the nut inserted into the forward part
of it, with a round hole in it and with a square part on it forward
of the termination of the thread on which a wrench is applied for
loosening tightening or removing this screw. The hole in it must
be large enough to receive the largest sized awl to be used and [illegible]
be smaller than the forward part of the shank of the awl to be used
as the design of this part is to secure and fasten the awl when
inserted 1 9823X July 1, 1836 inserted into the socket shank. The awl used must have a four equal sided shank tapering back, fitting the square hole in the socket shank first described and rounded or flattened on the front corners. To set the awl the forward screw above described must be removed with the wrench. The awl is then fixed in the socket shank and the screw being replaced with the wrench the awl will be firmly set and fastened. Awls of any size which can be passed through the hole in the forward screw may be used in the same Haft - and any one size may be readily substituted for a different size. the size of the shank of the different awls to be the same - The haft may also be used for a sewing awl constructed suitably to fit it - I claim as my invention the square form of the socket hole first described for receiving the shank of the awl also the conical nut - also the mode of securing the awl by the forward nut as above described, also the manner above described of combining the several parts for forming the entire "Haft".

Exd. Witnesses
H.G.C. Orlando Meeks
J. M. Edwards

Wm. Campbell.

July 1, 1836

(644 Words (Patented July 1. 1836)

Drawing